(12) United States Patent
Spendlove

(10) Patent No.: US 12,245,636 B1
(45) Date of Patent: *Mar. 11, 2025

(54) ATOMIZER AS PART OF A VAPORIZING SYSTEM WITH AN IMPROVED AIRFLOW AND HEATING SYSTEM

(71) Applicant: Brent Spendlove, Denver, CO (US)

(72) Inventor: Brent Spendlove, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,727

(22) Filed: Nov. 2, 2023

Related U.S. Application Data

(63) Continuation of application No. 16/453,381, filed on Jun. 26, 2019, now Pat. No. 11,805,819.

(51) Int. Cl.
| | |
|---|---|
| *A24F 40/48* | (2020.01) |
| *A24F 7/00* | (2006.01) |
| *A24F 40/10* | (2020.01) |
| *A24F 40/46* | (2020.01) |
| *C04B 35/565* | (2006.01) |
| *H05B 3/44* | (2006.01) |

(52) U.S. Cl.
CPC .............. *A24F 40/48* (2020.01); *A24F 7/00* (2013.01); *A24F 40/10* (2020.01); *A24F 40/46* (2020.01); *C04B 35/565* (2013.01); *H05B 3/44* (2013.01); *C04B 2235/3826* (2013.01)

(58) Field of Classification Search
CPC .................. A24F 40/10; A24F 40/46
See application file for complete search history.

(56) References Cited

U.S. PATENT DOCUMENTS

| | | | |
|---|---|---|---|
| 4,069,819 A | 1/1978 | Valentini et al. | |
| 11,805,819 B1* | 11/2023 | Spendlove | A24F 40/46 |
| 2014/0305449 A1* | 10/2014 | Plojoux | A24F 40/46 |
| | | | 131/328 |
| 2014/0353856 A1* | 12/2014 | Dubief | B01F 23/211 |
| | | | 261/128 |
| 2015/0122276 A1 | 5/2015 | Johnson et al. | |
| 2016/0100628 A1* | 4/2016 | Garcia | A24F 5/00 |
| | | | 131/185 |
| 2016/0227838 A1 | 8/2016 | Johnson et al. | |
| 2017/0042242 A1* | 2/2017 | Hon | A61M 15/06 |
| 2017/0208870 A1 | 7/2017 | Liu | |
| 2017/0325506 A1* | 11/2017 | Batista | A24F 40/42 |
| 2017/0354186 A1* | 12/2017 | Johnson | A61M 11/042 |
| 2018/0116294 A1* | 5/2018 | Saydar | A24F 40/30 |
| 2018/0221605 A1* | 8/2018 | Marks | A24F 40/46 |
| 2019/0037924 A1* | 2/2019 | Habicht | A24F 40/42 |
| 2019/0083720 A1* | 3/2019 | Leadley | A24F 40/485 |

* cited by examiner

*Primary Examiner* — Alex B Efta
(74) *Attorney, Agent, or Firm* — Avek IP, LLC

(57) ABSTRACT

A heat system for heating an oil within an atomizer includes a power source having one or more controls to activate energy transmission from the power source; a connection to electrically connect to the power source; an electrical connection to engage with the connection for receiving energy therefrom; a heat bucket to hold the oil for heating; the heat bucket is connected to the electrical connection to receive energy therefrom; and the heat bucket is to heat up such that the oil is heated.

17 Claims, 5 Drawing Sheets

ATOMIZER AS PART OF A VAPORIZING SYSTEM WITH AN IMPROVED AIRFLOW AND HEATING SYSTEM

RELATED APPLICATIONS

This application is a continuation of U.S. application Ser. No. 16/453,381, filed Jun. 26, 2019, which is incorporated by reference in its entirety herein.

FIELD OF INVENTION

The present invention relates generally to systems for recreational smoking and vaporizing, and more specifically, to a vaporizing system that includes an improved airflow system and heating system.

DESCRIPTION OF RELATED ART

Smoking and vaporizing systems are well known in the art and are an effective means of recreational enjoyment. For example, FIG. 1 depicts a conventional smoking system 101 having a cigarette 103 and an ash tray 105. During use, the user will utilize the cigarette as desired and use the ash tray to collect waste. Additional systems further include electronic cigarettes and vaporizing devices that allow a user to create a vapor from an oil or the like for inhalation. The foregoing systems discussed above are limited in use. For example, they may be difficult in clean up and may not be efficient in creating a most desirable vapor for inhalation.

Accordingly, there is room for improvement. The present invention provides for a vaporizing system that incorporates an improved air circulation feature as well as an improved heating element that allows for an improved experience for the user.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
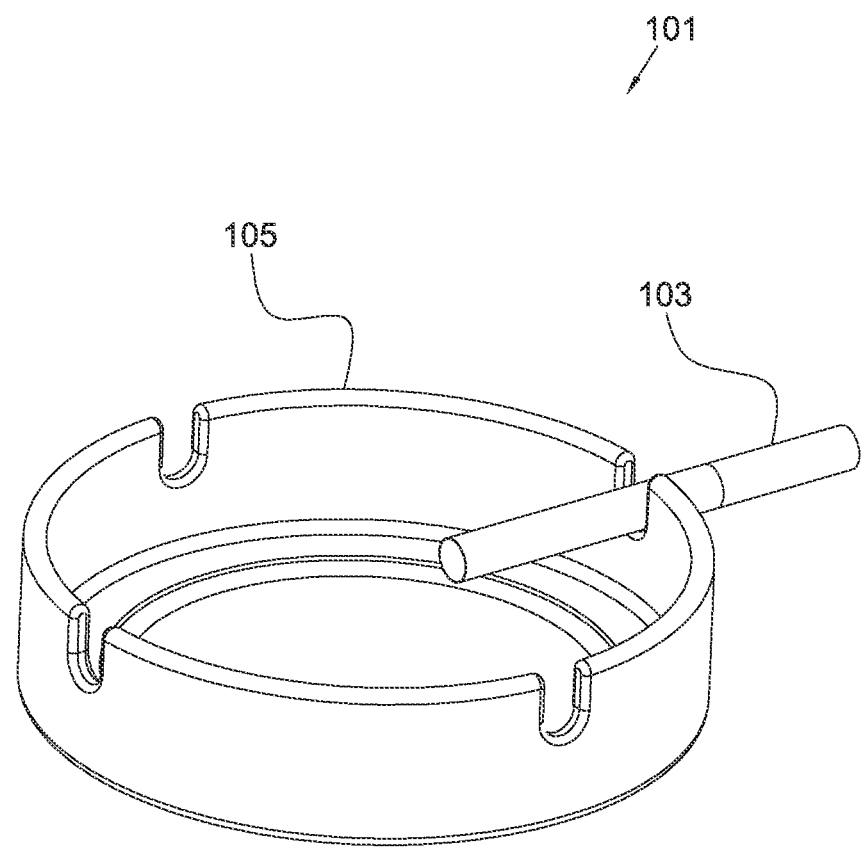
FIG. 1 is an isometric view of a common smoking system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vaporizing systems. Specifically, the present invention incorporates a novel heating system that allows for quick and consistent heating to create vapor from an oil. In addition, the system incorporates a novel air flow system for improved mixing of the air, oil, and heat. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
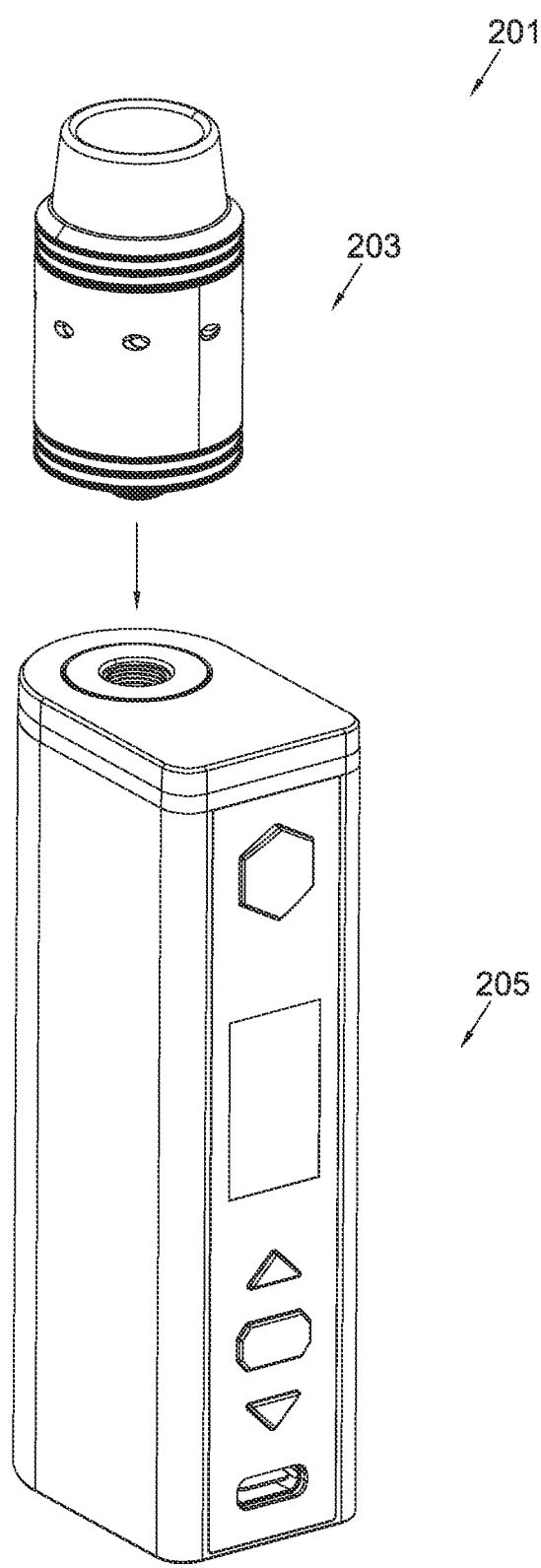
FIG. 2 is an isometric view of a vaporizing system in accordance with a preferred embodiment of the present application.

Referring now to the drawings wherein like reference characters identify corresponding or similar elements throughout the several views, FIG. 2 depicts an isometric view of a vaporizing system 201 in accordance with a preferred embodiment of the present application. It will be appreciated that system 201 overcomes one or more of the above-listed problems commonly associated with conventional vaporizing systems.

In the contemplated embodiment, system 201 includes a power source 205 with a plurality of controls and configured to provide power to and engage with an atomizer 203. It should be appreciated that the power source 205 can vary based on aesthetical, functional, or manufacturing considerations.

Figure 3:
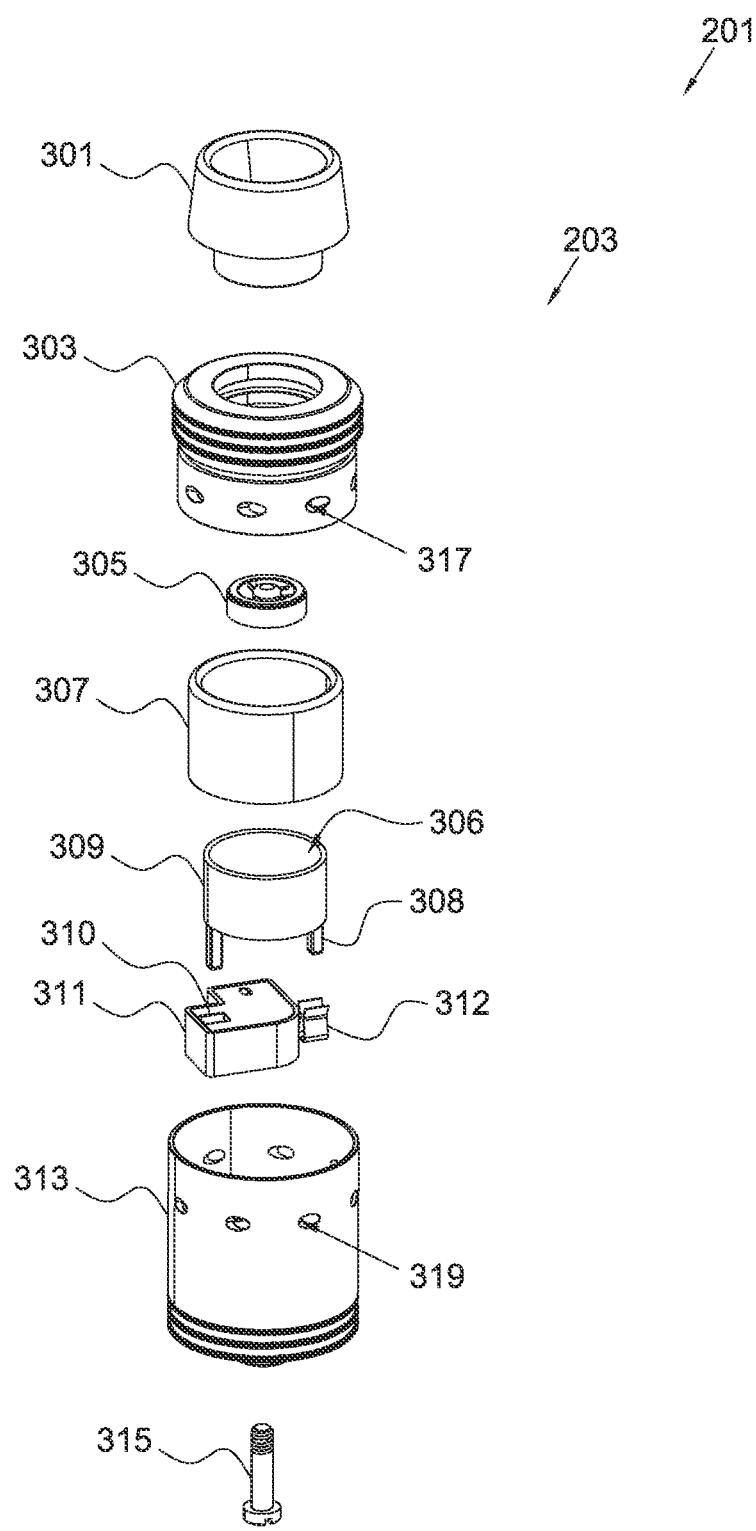
FIG. 3 is a disassembled view of an atomizer of FIG. 2.
Figure 4:
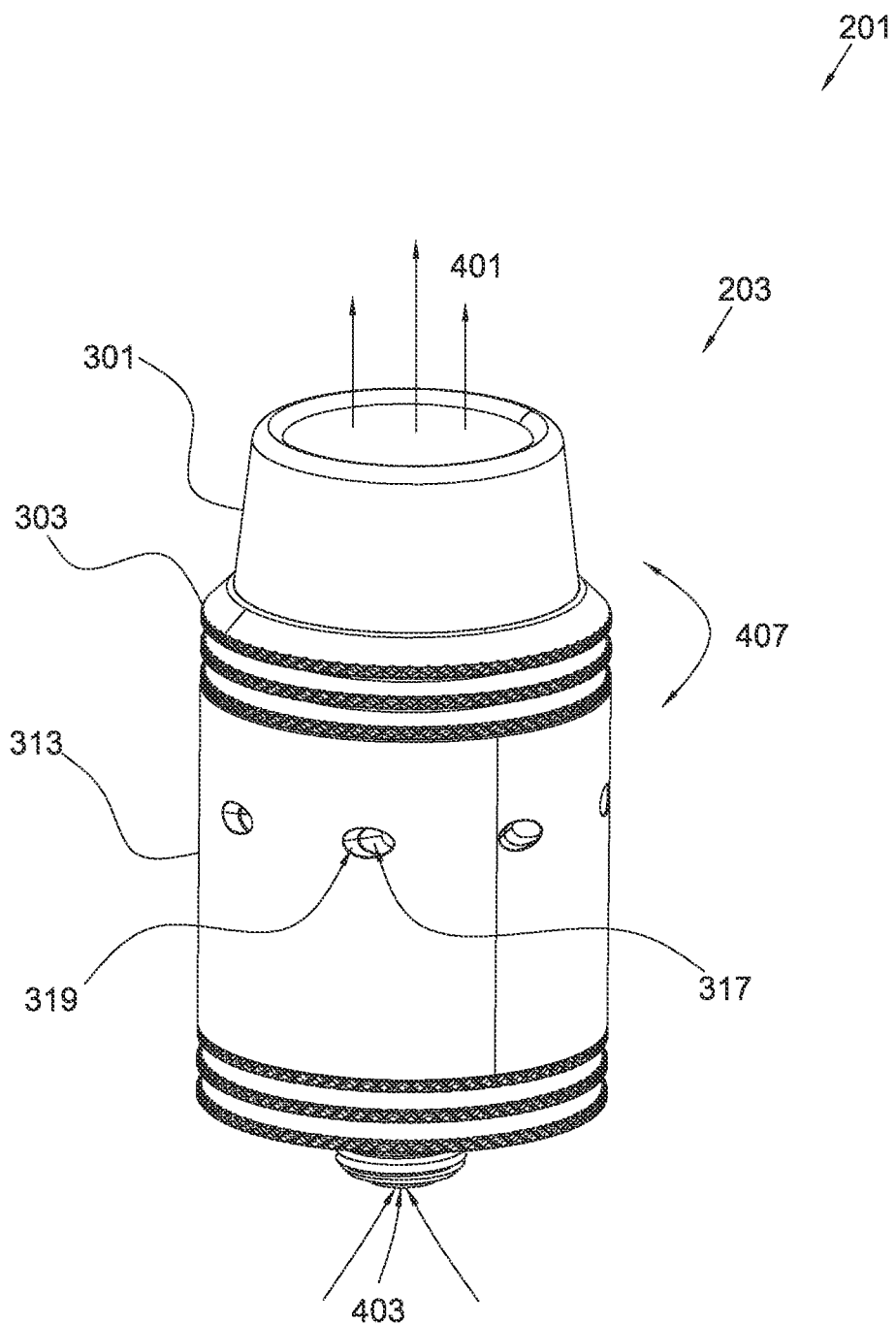
FIG. 4 is an assembled view of the atomizer of FIG. 3.
Figure 5:
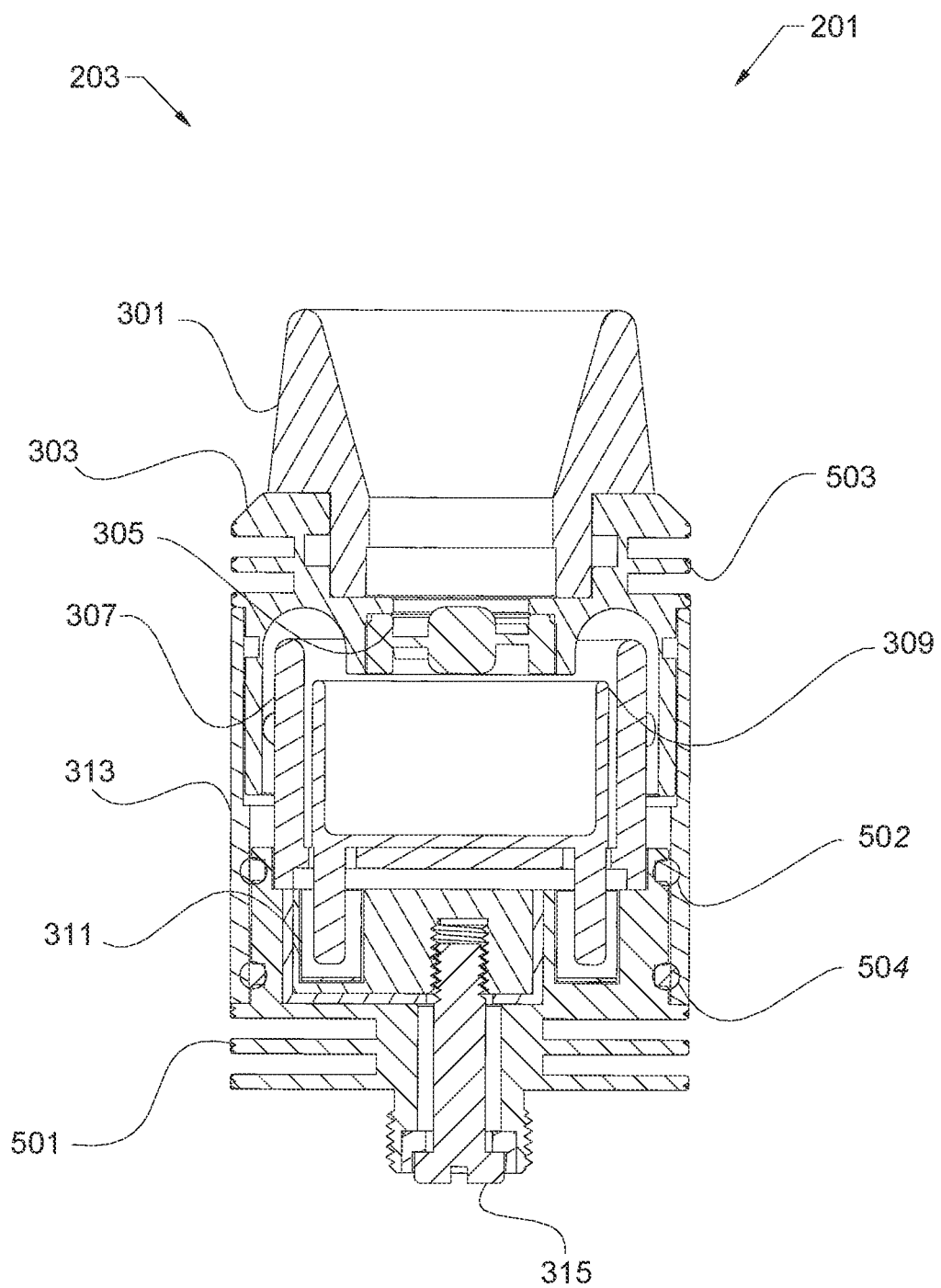
FIG. 5 is a cross sectional view of the atomizer of FIG. 2.

In FIGS. 3-5, the features of the atomizer 203 are shown for clarity. As shown, system 201 includes an atomizer base 313 extending from a bottom end to a top end, the atomizer base having a first plurality of tapered or vectored openings 319 extending through a thickness of the base. System 201 further includes an atomizer top 303 having a second plurality of tapered openings 317 extending through a thickness of the atomizer top. As shown best in FIGS. 4 and 5, the base and top are configured to slidingly engage, such that the first and second plurality of openings align, and such that the user can alter the alignment by rotating the top relative to the base, thereby directly changing the airflow. As further shown, the atomizer base 313 can include one or more O-rings 502, 504 that secure between the top and the base when secured together.

System 201 further includes a chamber 307 configured to sit within the atomizer base such that a gap is created between an exterior surface of the chamber 307 and an interior surface of the top. This gap is configured to further allow for air flow around the chamber 307.

As shown, the system 201 can further include a stationary fan 305 positioned within the atomizer top and further configured to aid in airflow.

It should be appreciated that one of the unique features believed characteristic of the present application is the airflow created within the chamber. It should be appreciated and understood that the invention comprises a 360 degree vortex air inlet that spins air around the chamber. This feature is achieved the plurality of openings, which are vectored to direct airflow as air is pulled into the device. The user can adjust, as shown with arrow 407, as desired to increase or decrease the airflow. Further, the fan 305 which is positioned near the vapor outlet furthers this effect. This feature acts to increase vaporization efficiency by mixing the air, oil, and heat more evenly. Further, this feature prevents excess heat in the vapor, thereby making the vapor smoother and more enjoyable for the user.

System 201 further includes a mouthpiece 301 configured to engage with the top and emit vapor 401 therethrough and a connection 315 configured to connect to the power source 205, such that a heating element receives heat to vaporize the oil.

System 201 yet further includes a heating assembly that includes a bucket 309 with an interior area 306 and one or more legs 308. The heating assembly further includes an electrical connection 311 with one or more spring loaded clips 310, 312, wherein the one or more spring loaded clips 310, 312 are configured to receive the one or more legs 308. During use, an oil is placed in interior area 306 of the bucket 309 and the bucket 309 is engaged with the electrical connection 311 via the legs and spring loaded clips. The electrical connection 311 is further connected to connection 315, thereby being configured to receive power from the power source.

It should be appreciated that another unique feature believed characteristic of the present invention is that in the preferred embodiment, the bucket 309 is composed of silicon carbide. It should be appreciated that silicon carbide is a semiconductor and is configured to heat up directly, thereby eliminating the need for an additional heating element to vaporize the oil. It should be appreciated that the electrical resistance of silicon carbide changes as it heats up, and by monitoring this change in resistance, the system can be configured to allow the user to select a desired temperature.

The lack of an additional heating element outside of the bucket allows for the bucket to heat up faster and more efficiently than conventional heating systems. Further, the high thermal conductivity of the silicon carbide material provides a means for the bucket to cool down quickly, which prevents user burns. In addition, the silicon carbide will not emit dangerous and toxic materials when heated. Yet further, the bucket can be easily cleaned, as the bucket can be removed and cleaned, and then replaced into the system. Further, the bucket allows for consistent and uniform heating which can provide an improved vapor. Yet further, the silicon carbide material is nonstick, which further aids for cleaning and maintenance.

As shown in FIG. 4, during use, power 403 is pulled from the power source, wherein the connection 315 supplies the power to the electrical connection and the bucket 309. The bucket will then heat up, thereby turning the oil into a vapor 401 to be emitted through the mouthpiece 301. In some embodiments, a bottom 501 and top 503 knurled heat sink can further be included to diffuse heat within the system, in addition this style of heat sink allows for a grip for the user.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set form in the description. Although the present embodiments are shown above, they are not limited to just these embodiments, but are amenable to various changes and modifications without departing from the spirit thereof.

The invention claimed is:

1. An atomizer as part of a vaporizing system, the atomizer comprising:
    an atomizer base extending from a bottom end to a top end;
    an atomizer top engaged with the atomizer base from the top end;
    a chamber configured to sit within the atomizer base and within the atomizer top;
    a heat bucket positioned within the chamber, the heat bucket composed of a semiconductor and forming a cavity configured to hold a substance for vaporizing, the bucket forms all sides of the cavity such that the heat bucket comes into direct contact with the substance; and
    an electrical connection configured to transmit electrical current to the heat bucket to directly heat the heat bucket;
    wherein the atomizer top is engaged with the atomizer base; and
    wherein the heat bucket is configured to heat up due to electrical current flowing through the heat bucket as generated from a power source, wherein the electrical current flows from the electrical connection to the heat bucket such that the substance is heated for vaporizing.

2. The atomizer of claim 1, wherein the heat bucket further comprises one or more legs configured to engage with one or more spring clips of the electrical connection such that the electrical current is transmitted between the one or more spring clips and the one or more legs.

3. The atomizer of claim 1, wherein the atomizer base further comprises a first plurality of openings and the atomizer top further comprises a second plurality of openings.

4. The atomizer of claim 3, wherein the first plurality of openings and the second plurality of openings each comprise tapered openings such that airflow through the first plurality of openings and the second plurality of openings is directed to circulate through the chamber.

5. The atomizer of claim 1, wherein the bucket is composed of silicon carbide.

6. The atomizer of claim 1, wherein the chamber is positioned within the atomizer base and the atomizer top such that a gap is created between an exterior surface of the chamber and an interior surface of the atomizer top.

7. The atomizer of claim 1, further comprising a stationary fan positioned within the atomizer top.

8. The atomizer of claim 1, wherein the atomizer base further comprises a first heat sink.

9. The atomizer of claim 8, wherein the atomizer top further comprises a second heat sink.

10. A heat system for heating a substance within an atomizer, the heat system comprising:
- a power source having one or more controls configured to activate electrical current flow from the power source;
- a connection electrically connected to the power source;
- an electrical connection connected to the connection for receiving electrical current therefrom;
- a heat bucket composed of a semiconductor and forming a cavity configured to hold the substance for heating, the heat bucket forms all sides of the cavity such that the heat bucket comes into direct contact with the substance, and the heat bucket is configured to receive the electrical current from the electrical connection, the electrical connection configured to transmit electrical current to the heat bucket to directly heat the heat bucket;
- wherein the heat bucket is configured to heat up due to the electrical current flowing through the heat bucket, wherein the electrical current flows through the electrical connection to the heat bucket such that the substance is heated for vaporizing.

11. The heat system of claim 10, wherein the heat bucket further comprises one or more legs configured to engage with one or more spring clips of the electrical connection such that the electrical current is transmitted between the one or more spring clips and the one or more legs.

12. The heat system of claim 10, wherein the heat bucket consists of a body forming the cavity and one or more legs extending from the body, the interior area configured to hold the substance.

13. The heat system of claim 12, wherein the body and the one or more legs are composed of silicon carbide.

14. The heat system of claim 10, wherein the connection is threadingly engaged with the electrical connection.

15. The heat system of claim 14, wherein the connection is threadingly engaged with the electrical connection from a bottom end of the electrical connection and wherein the heat bucket is connected to the electrical connection from a top end of the electrical connection.

16. The atomizer of claim 1, wherein the substance is an oil.

17. The atomizer of claim 10, wherein the substance is an oil.

* * * * *